United States Patent
Shinmura

(10) Patent No.: US 7,900,727 B2
(45) Date of Patent: Mar. 8, 2011

(54) IN-VEHICLE DEVICE COOLING APPARATUS

(75) Inventor: Osamu Shinmura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 408 days.

(21) Appl. No.: 11/992,944

(22) PCT Filed: Sep. 21, 2006

(86) PCT No.: PCT/JP2006/319233
§ 371 (c)(1),
(2), (4) Date: Apr. 1, 2008

(87) PCT Pub. No.: WO2007/043341
PCT Pub. Date: Apr. 19, 2007

(65) Prior Publication Data
US 2009/0260905 A1    Oct. 22, 2009

(30) Foreign Application Priority Data
Oct. 6, 2005  (JP) .............................. 2005-293655

(51) Int. Cl.
*B60K 11/00*  (2006.01)
(52) U.S. Cl. ...................... 180/68.1; 180/68.2; 180/68.3
(58) Field of Classification Search ................ 180/68.1, 180/68.2, 68.3, 68.5, 65.1; 62/186, 244, 62/259.2, 239
See application file for complete search history.

(56) References Cited

U.S. PATENT DOCUMENTS

| | | | |
|---|---|---|---|
| 5,490,572 A * | 2/1996 | Tajiri et al. .................. | 180/65.1 |
| 6,094,927 A * | 8/2000 | Anazawa et al. ............... | 62/239 |
| 6,204,769 B1 * | 3/2001 | Arai et al. ................... | 180/65.1 |
| 6,220,383 B1 * | 4/2001 | Muraki et al. ............... | 180/68.5 |
| 6,541,151 B2 * | 4/2003 | Minamiura et al. ........ | 180/68.5 |
| 6,662,891 B2 * | 12/2003 | Misu et al. .................. | 180/68.1 |
| 7,240,752 B2 * | 7/2007 | Takahashi et al. .......... | 180/68.1 |
| 7,353,900 B2 * | 4/2008 | Abe et al. .................. | 180/68.5 |
| 7,451,608 B2 * | 11/2008 | Kikuchi ....................... | 62/186 |
| 7,631,712 B2 * | 12/2009 | Watanabe .................. | 180/68.5 |
| 2003/0067747 A1 | 4/2003 | Hasegawa et al. | |
| 2005/0168180 A1 | 8/2005 | Minekawa et al. | |

FOREIGN PATENT DOCUMENTS

| | | |
|---|---|---|
| JP | 07-047846 | 2/1995 |
| JP | 2002-084604 A | 3/2002 |
| JP | 2003-100272 A | 4/2003 |
| JP | 2003-112531 A | 4/2003 |

(Continued)

*Primary Examiner*—Hau V Phan
(74) *Attorney, Agent, or Firm*—Kenyon & Kenyon LLP

(57) ABSTRACT

A cooling apparatus cools a battery and a DC/DC converter. In a duct, a battery cooling fan having a great rated capacity is installed. The duct branches into a battery-side intake duct and a DC/DC converter-side intake duct on the downstream side of the battery cooling fan. In the battery-side intake duct, the battery is installed to received cooling air. In the DC/DC converter side intake duct, the DC/DC converter is installed to receive cooling air. A DC/DC converter cooling fan having a small rated capacity is installed directly upstream of the DC/DC converter. An ECU controls the two cooling fans based on the temperature of the battery and the DC/DC converter.

15 Claims, 9 Drawing Sheets

FOREIGN PATENT DOCUMENTS

| | | |
|---|---|---|
| JP | 2004-048981 A | 2/2004 |
| JP | 2004-306726 A | 11/2004 |
| JP | 2004-319232 A | 11/2004 |
| JP | 2005-019231 A | 1/2005 |
| JP | 2005-063689 A | 3/2005 |
| JP | 2005-160132 A | 6/2005 |
| JP | 2005-218283 A | 8/2005 |
| JP | 2005-247157 A | 9/2005 |
| JP | 2005-318675 A | 11/2005 |

* cited by examiner

F I G. 5
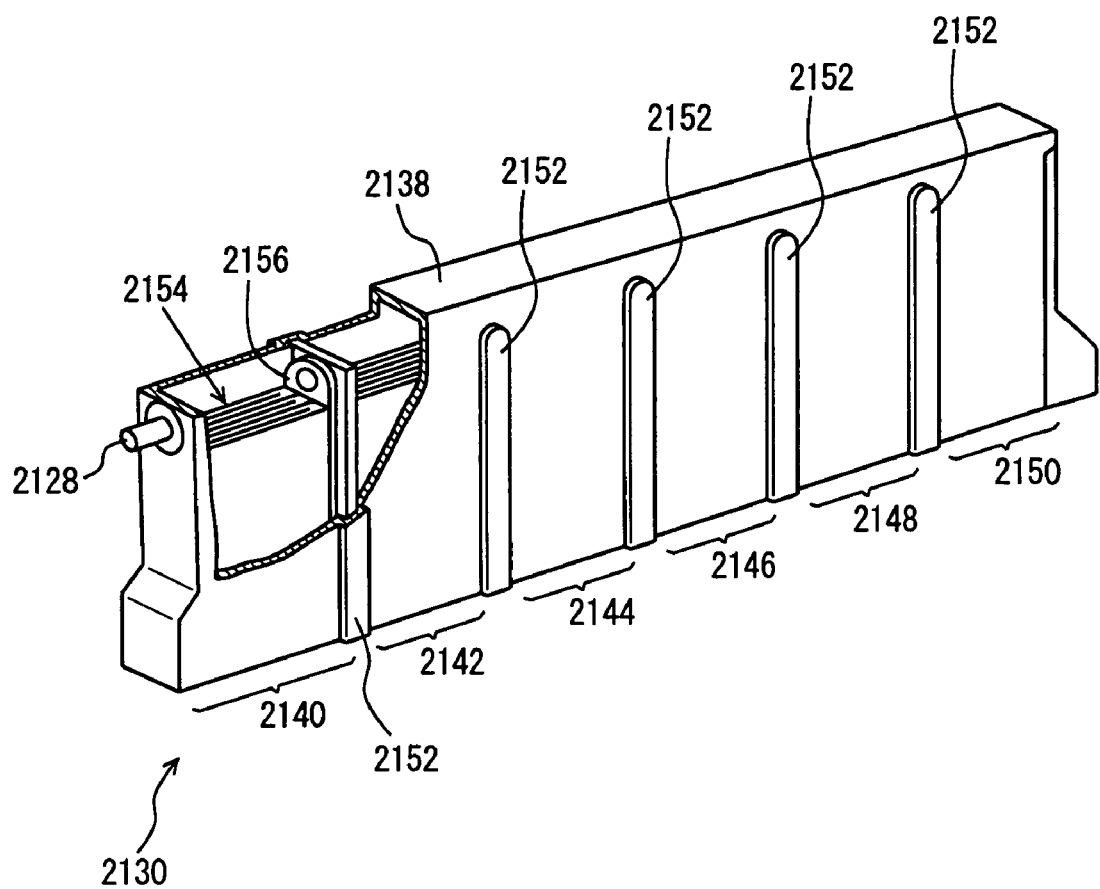

F I G. 6
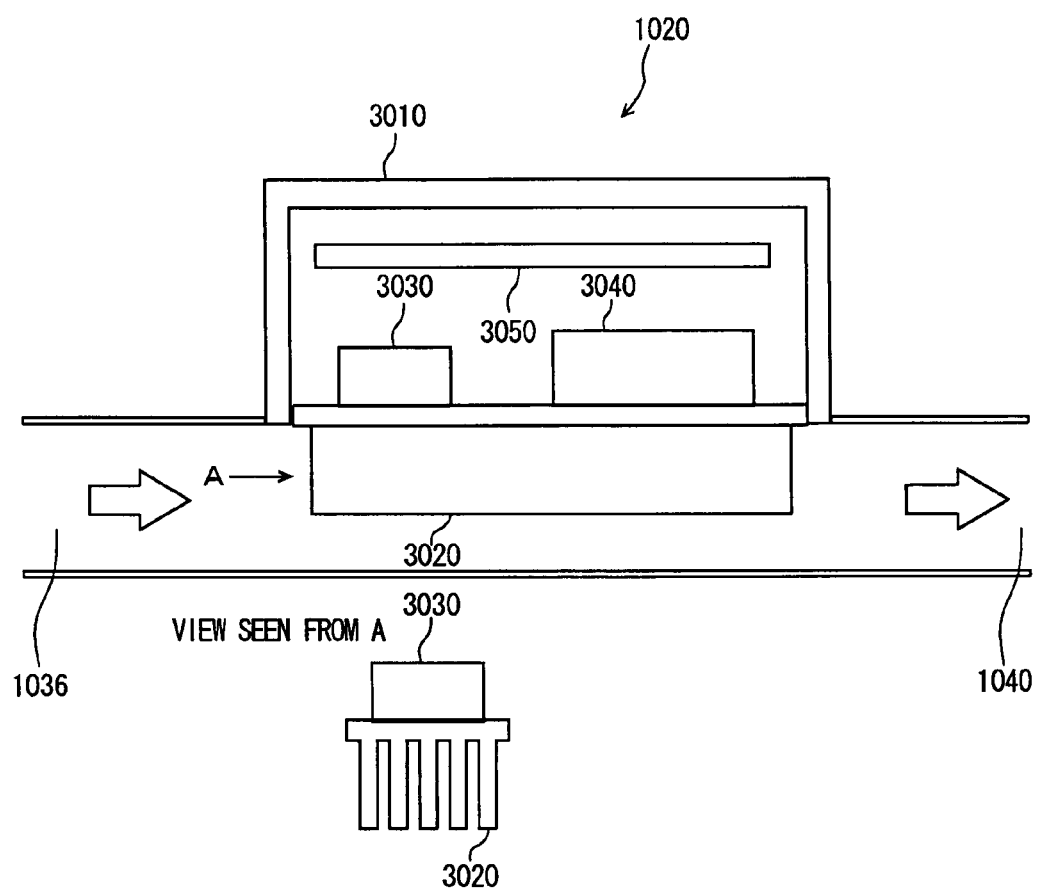

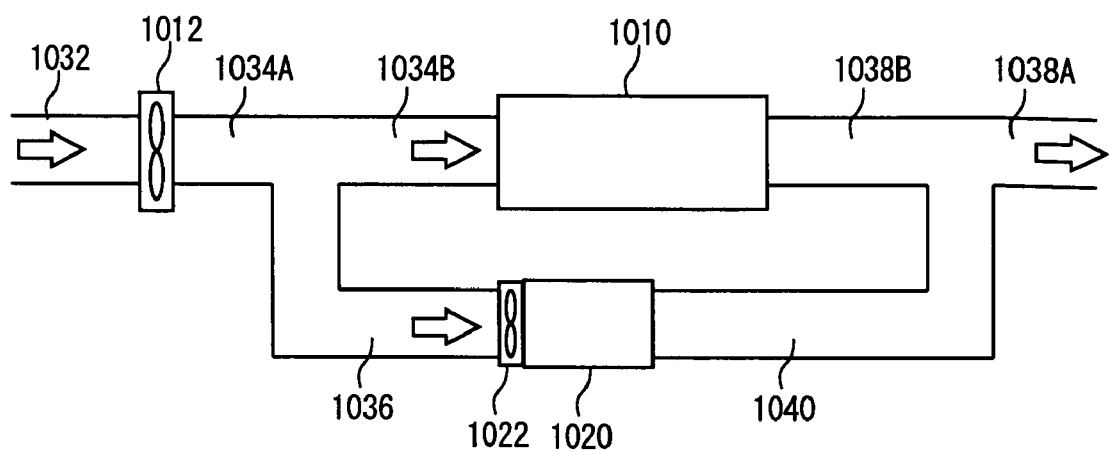
F I G. 7

IN-VEHICLE DEVICE COOLING APPARATUS

This is a 371 national phase application of PCT/JP2006/319233 filed 21 Sep. 2006, claiming priority to Japanese Patent Application No. 2005-293655 filed 6 Oct. 2005, the contents of which are incorporated herein by reference.

TECHNICAL FIELD

The present invention relates to a cooling apparatus for an in-vehicle device, and particularly, to a cooling apparatus for an in-vehicle device that can cool the device appropriately.

BACKGROUND ART

A vehicle incorporating powertrain referred to as a hybrid system has been developed and put into practical use. The hybrid system is a combination of an internal combustion engine (for example, a known engine such as a gasoline engine, a diesel engine or the like may be used) and an electric motor. Such a vehicle incorporates electric devices such as a secondary battery for driving an electric motor for traveling purpose, an inverter, a DC/DC converter and the like. The secondary battery is discharged and charged by a chemical reaction, which is associated with heat generation, and therefore the secondary battery must be cooled. The inverter and the DC/DC converter must also be cooled since their power devices generate heat.

Such a secondary battery is in some cases arranged between the rear seat of the vehicle and the luggage room. The secondary battery is arranged in a duct-like casing that forms an air passage. On the upstream side, in terms of air flow, of the secondary battery in the casing, between the battery and the rear seat, a cooling fan that generates cooling air for cooling the battery is arranged. Since the upstream-side end of the casing communicates with the cabin (specifically, opens to a rear package tray), the secondary battery is cooled by the air in the cabin.

In some cases, the inverter, the DC/DC converter and the like may be integrally incorporated as an electric device referred to as a PCU (Power Control Unit) in the vehicle. The PCU is stored in the engine room and cooled by air or water as a medium.

Since the secondary battery or the PCU must be incorporated in the hybrid vehicle in addition to the engine, the secondary battery or the PCU must be reduced in size for improved suitability for such incorporation. Japanese Patent Laying-Open No. 2004-306726 discloses a cooling structure for a battery pack including a battery and electric devices such as a DC/DC converter, a system main relay and the like, which excellently cools both the battery and the electric devices without increasing the size of the battery pack. The cooling structure is for cooling a battery pack for a vehicle, which is constituted of a battery portion having a battery module, and an accessory portion configured to include electric components associated with the battery portion. The cooling structure includes a flow passage for allowing a cooling medium to flow in parallel with the battery portion and the accessory portion, and a cooling fan for allowing the cooling medium to flow through the flow passage.

According to the battery pack cooling structure, the cooling fan allows the cooling medium to flow through the flow passage in parallel with the battery portion and the accessory portion, and therefore the battery module and the electric components can both be cooled efficiently and be reduced in size.

However, the battery pack cooling structure disclosed in Japanese Patent Laying-Open No. 2004-306726 cools both the battery module and the electric components using the fan that is shared by the battery portion and the accessory portion included in the battery pack. Accordingly, even though the battery pack including the cooling fan (and the battery module and the electric components) may be reduced in size, it is not possible to appropriately respond to a cooling request from one of the battery module and the electric components.

DISCLOSURE OF THE INVENTION

The present invention has been made to solve the above-described problem, and an object thereof is to provide a cooling apparatus that can precisely cool a power storage mechanism, e.g., a secondary battery, and an electric device, which are in-vehicle devices.

A cooling apparatus according to one aspect of the present invention cools a power storage mechanism and an electric device that are incorporated in a vehicle. The cooling apparatus includes: a first supply passage supplying a medium that cools the power storage mechanism to the power storage mechanism; and a second supply passage supplying a medium that cools the electric device to the electric device. One of the first and second supply passages branches from the other at a branching portion on upstream side of the power storage mechanism and the electric device. The cooling apparatus further includes an adjustment mechanism adjusting a flow rate of the medium supplied to the first supply passage and a flow rate of the medium supplied to the second supply passage, in accordance with a cooling request of the power storage mechanism and a cooling request of the electric device.

According to the present invention, one of the first and second supply passages is configured to branch from the other at the branching portion on the upstream side of the power storage mechanism and the electric device. Therefore, the supply passages can be shared and the size of the cooling apparatus can be suppressed. Furthermore, for example at the branching portion, the adjustment mechanism adjusting the flow rate of the medium flowing through the first (or second) supply passage is installed. As the adjustment mechanism adjusts the flow rate of the medium in accordance with a cooling request of the power storage mechanism and that of the electric device, the one having the greater cooling request than the other can be supplied with the greater medium. As a result, the cooling apparatus that can precisely cool the power storage mechanism and an electric device, which are the in-vehicle devices, can be provided.

Preferably, the adjustment mechanism includes a mechanism that is installed in at least one of the branching portion, a supply passage upstream from the branching portion, and a supply passage downstream from the branching portion, and that varies a cross-sectional area of an opening of the second supply passage.

According to the present invention, by varying the cross-sectional area of the opening of the second supply passage at the branching portion, the flow rate of the medium flowing through the second supply passage (and hence the flow rate of the medium flowing through the first supply passage) can be adjusted.

Further preferably, the adjustment mechanism includes: a first medium supply mechanism that is installed upstream from the branching portion and that supplies the medium; a second medium supply mechanism that is installed in one of the first supply passage and the second supply passage downstream from the branching portion and that supplies the medium; and a control unit controlling the medium supply mechanisms.

According to the present invention, a pump (for a liquid medium) or a fan (for a gas medium) is installed upstream from the branching portion as the first medium supply mechanism. Further, an additional second medium supply mechanism is installed in one of the supply passages downstream from the branching portion. By the control unit controlling the medium supply mechanisms in accordance with the cooling requests of the power storage mechanism and the electric device so that one of or both of the two medium supply mechanisms is/are operated, the power storage mechanism and the electric device can appropriately be cooled. As a result, the cooling apparatus that can precisely cool the power storage mechanism and an electric device, which are the in-vehicle devices, can be provided.

A cooling apparatus according to another aspect of the present invention cools a power storage mechanism and an electric device that are incorporated in a vehicle. The cooling apparatus includes: a first supply passage supplying a medium that cools the power storage mechanism to the power storage mechanism; and a second supply passage supplying a medium that cools the electric device to the electric device. One of the first and second supply passages merges into the other at a merging portion on downstream side of the power storage mechanism and the electric device. The cooling apparatus further includes an adjustment mechanism adjusting a flow rate of the medium supplied to the first supply passage and a flow rate of the medium supplied to the second supply passage, in accordance with a cooling request of the power storage mechanism and a cooling request of the electric device.

According to the present invention, it is configured such that one of the first and second supply passages merges into the other at the merging portion on the downstream side of the power storage mechanism and the electric device. Therefore, the supply passages can be shared and the size of the cooling apparatus can be suppressed. Furthermore, for example at the merging portion, the adjustment mechanism adjusting the flow rate of the medium flowing through the first (or second) supply passage is installed. As the adjustment mechanism adjusts the flow rate of the medium in accordance with a cooling request of the power storage mechanism and that of the electric device, the one having the greater cooling request than the other can be supplied with the greater medium. As a result, the cooling apparatus that can precisely cool the power storage mechanism and an electric device, which are the in-vehicle devices, can be provided.

Preferably, the adjustment mechanism includes a mechanism that is installed in at least one of the merging portion, a supply passage upstream from the merging portion, and a supply passage downstream from the merging portion, and that varies a cross-sectional area of an opening of the second supply passage.

According to the present invention, by varying the cross-sectional area of the opening of the second supply passage at the merging portion, the flow rate of the medium flowing through the second supply passage (and hence the flow rate of the medium flowing through the first supply passage) can be adjusted.

Further preferably, the adjustment mechanism includes: a first medium supply mechanism that is installed downstream from the merging portion and that supplies the medium; a second medium supply mechanism that is installed in one of the first supply passage and the second supply passage upstream from the merging portion and that supplies the medium; and a control unit controlling the medium supply mechanisms.

According to the present invention, a pump (for a liquid medium) or a fan (for a gas medium) is installed downstream from the merging portion as the first medium supply mechanism. Further, the additional second medium supply mechanism is installed in one of the supply passages upstream from the merging portion. By the control unit controlling the medium supply mechanisms in accordance with the cooling requests of the power storage mechanism and the electric device so that one of or both of the two medium supply mechanisms is/are operated, the power storage mechanism and the electric device can appropriately be cooled. As a result, the cooling apparatus that can precisely cool the power storage mechanism and an electric device, which are the in-vehicle devices, can be provided.

Further preferably, the second medium supply mechanism is installed in a supply passage where one of the power storage mechanism and the electric device having a greater cooling request than the other is installed.

According to the present invention, the second medium supply mechanism is installed in the supply passage where the device having the greater cooling request than the other is installed, and that supply passage is supplied with the medium by the two medium supply mechanisms arranged in series. Accordingly, the device having the greater cooling request can be cooled more strongly.

Further preferably, a capacity of the second medium supply mechanism is smaller than a capacity of the first medium supply mechanism.

According to the present invention, when the two medium supply mechanisms operate, if the capacity of the second medium supply mechanism is greater than that of the first medium supply mechanism, the supply passage where the second medium supply mechanism is installed is supplied with the greater medium. In order to avoid such a situation, the capacity of the second medium supply mechanism is set to be smaller than that of the first medium supply mechanism. Thus, even when both the power storage mechanism and the electric device request cooling, both of them can appropriately be cooled.

Further preferably, the medium is gas and the medium supply mechanism is a fan.

According to the present invention, by supplying cooling gas (air) by the fan, the power storage mechanism and/or the electric device can appropriately be cooled.

Further preferably, the power storage mechanism is at least one of a secondary battery and a capacitor, and the electric device is a power converting device.

According to the present invention, for example by supplying the cooling gas (air) by the fan, at least one of the secondary battery and the capacitor, and/or the power converting device can appropriately be cooled.

Further preferably, the power converting device is at least one of an inverter and a converter.

According to the present invention, for example by supplying the cooling gas (air) by the fan, at least one of the secondary battery and the capacitor, and/or at least one of the inverter and the converter can appropriately be cooled.

BRIEF DESCRIPTION OF THE DRAWINGS

FIG. 5 is a schematic perspective view of a battery module constituting the battery pack in FIG. 4.

FIG. 6 is a schematic developed view of the DC/DC converter in FIG. 3.

FIG. 7 is a schematic view of the structure of the cooling apparatus according to the embodiment of the present invention.

BEST MODES FOR CARRYING OUT THE INVENTION

Figure 1:
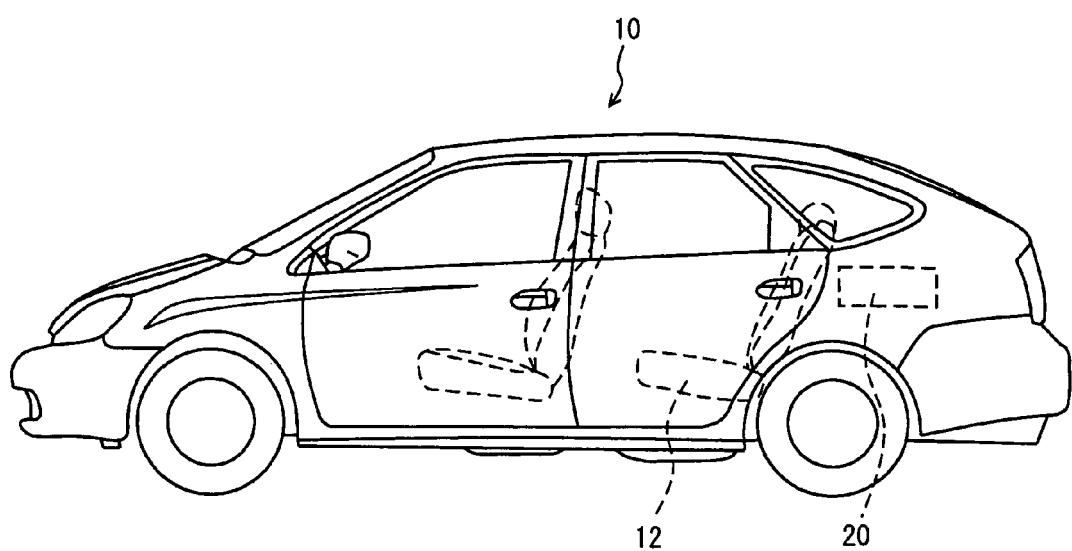
FIG. 1 is a side view of a vehicle in which a cooling apparatus according to an embodiment of the present invention is incorporated.

In the following, referring to the drawings, an embodiment of the present invention will be described. In the following description, the same components are denoted by the same reference characters. Their name and function are also the same. Accordingly, detailed description thereof will not be repeated.

Figure 2:
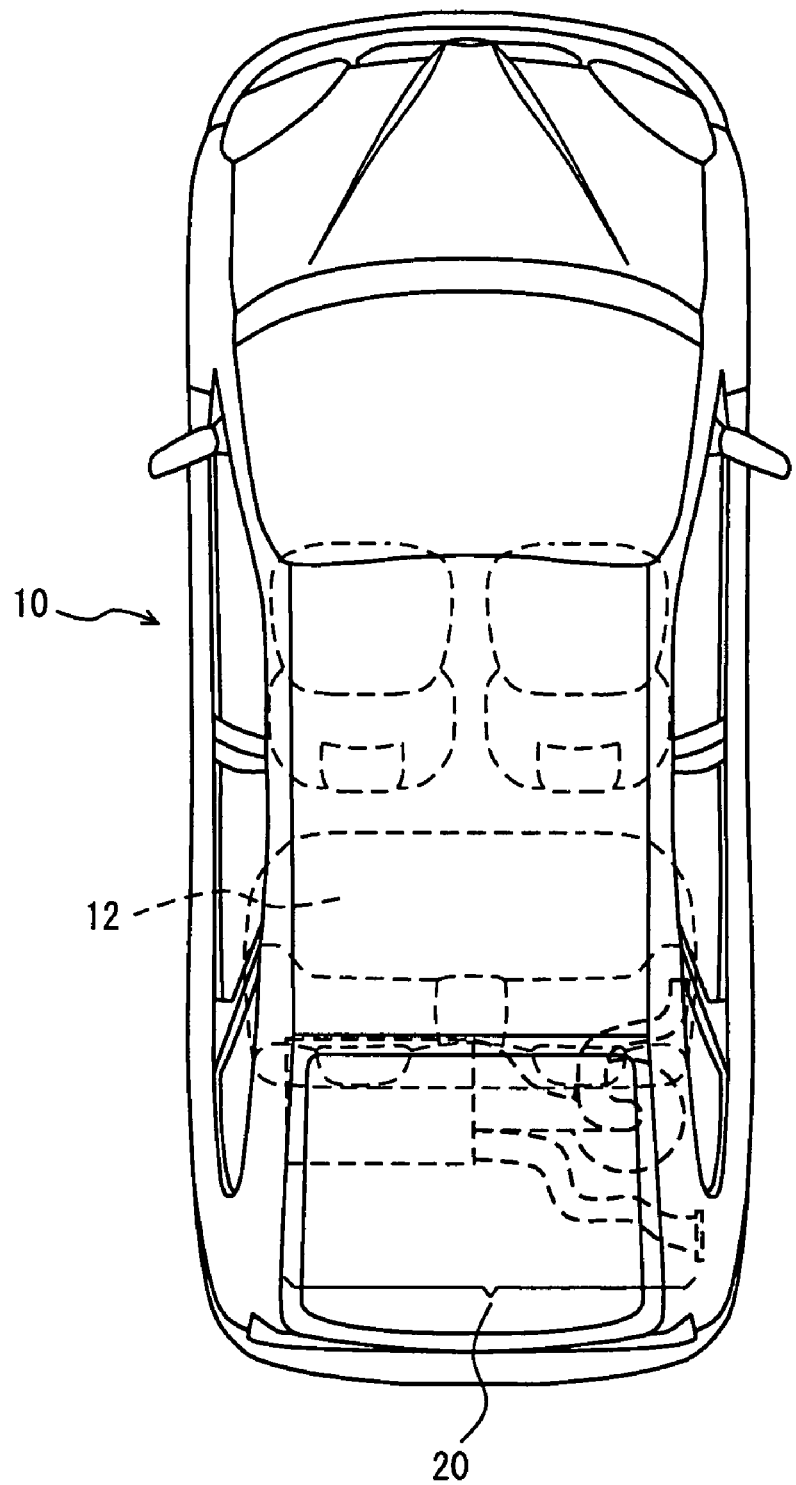
FIG. 2 is a top view of the vehicle in which the cooling apparatus according to the embodiment of the present invention is incorporated.

Referring to FIGS. 1 and 2, a vehicle 10 in which a cooling apparatus for a drive-purpose power supply unit 20 is employed is described. Drive-purpose power supply unit 20 is constituted of a power storage mechanism and an associated electric device. The power storage mechanism may be a secondary battery (hereinafter also referred to as a battery), and also may be fuel cells, a capacitor or the like. When the power storage mechanism is a battery, it may be any of a lead-acid battery, a lithium-ion battery, and a nickel-hydride battery, or it may be any other battery. The associated electric device is an electric device such as an inverter or a DC/DC converter, which must be cooled.

In the following, description will be given assuming that the power storage mechanism is a battery (a nickel-hydride battery) and the associated electric device is a DC/DC converter, and that drive-purpose power supply unit 20 is incorporated in the rear portion of the vehicle. Accordingly, in the embodiment of the present invention, the inverter and the DC/DC converter are incorporated in vehicle 10 as separate devices. Being the separate devices, the inverter and the DC/DC converter can separately be replaced. This can prevent the inconvenience, associated with integrated inverter and DC/DC converter, of having to replace both of them for a failure of only one of them.

Drive-purpose power supply unit 20 shown in FIGS. 1 and 2 is constituted of a battery portion 100, and an intake pipe line and an exhaust pipe line that are part of a cooling apparatus associated with battery portion 100. Battery portion 100 includes a battery pack, which is constituted of a plurality of battery modules each constituted of a plurality of battery cells. For example, six cells constitute one module, and thirty modules constitute one battery pack.

As shown in FIGS. 1 and 2, in vehicle 10, drive-purpose power supply unit 20 supplying power to a motor for driving vehicle 10 is mounted, behind a rear seat 12 and above a luggage room floor.

While it is shown in FIG. 2 that the cooled air in the cabin is suctioned from behind the rear seat, the present invention is not limited thereto. The cooled air may be suctioned from the side of the rear seat, or from above or below the rear seat. Also, the air can be emitted into the cabin.

Figure 3:
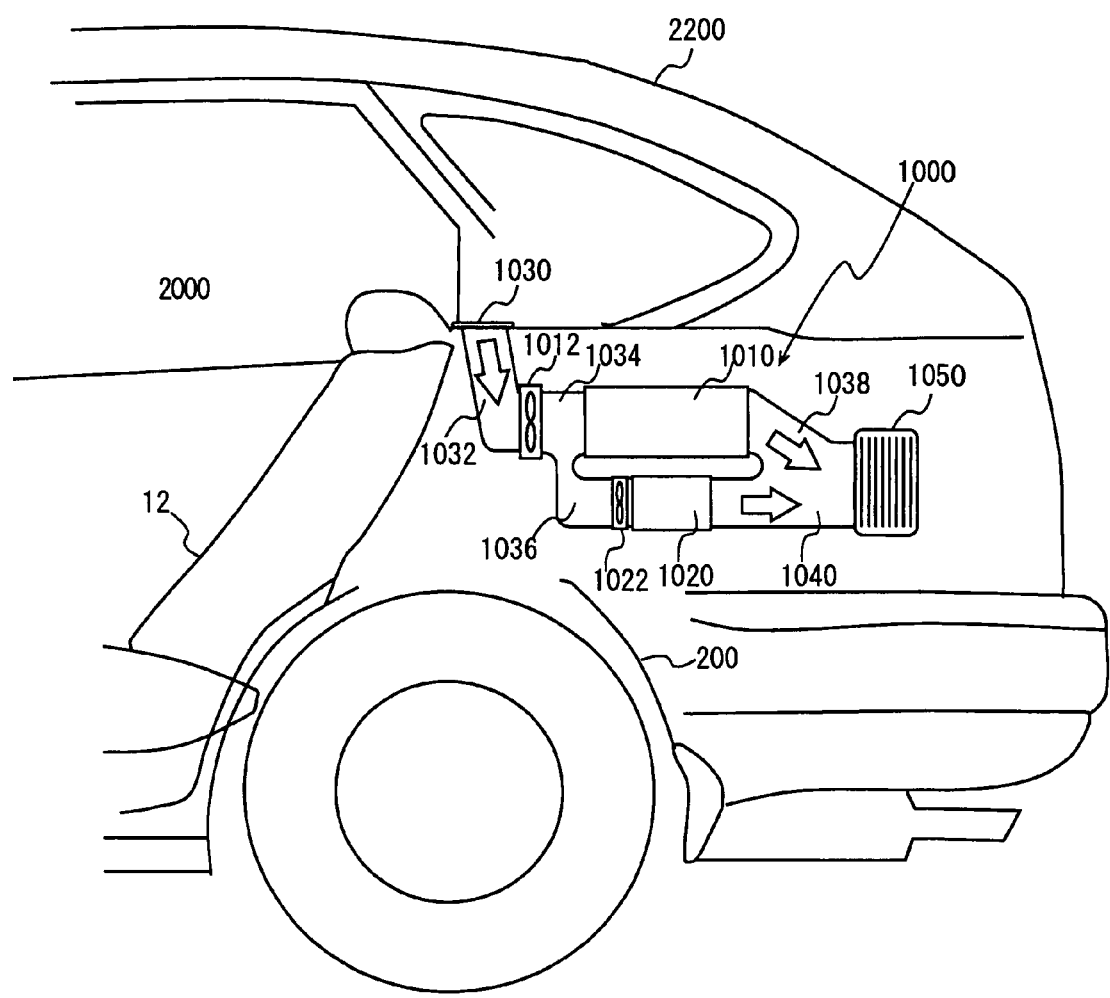
FIG. 3 is an enlarged view of FIG. 1.

FIG. 3 is a partial enlarged view of FIG. 1. In FIG. 3, only the rear portion of vehicle 10 including rear seat 12 is shown.

FIG. 3 shows a cooling apparatus 1000 for drive-purpose power supply unit 20 according to the embodiment of the present invention is shown. As shown in FIG. 3, cooling apparatus 1000 is arranged in a luggage room located on the rear side in the vehicle relative to an in-cabin space (a space for occupants) 2000 (it is to be noted that the luggage room is a space except for the space for occupants). Cooling apparatus 1000 is arranged at substantially the center in the vehicular width direction so as not to interfere with tire houses 200 on the opposing sides in the vehicular width direction.

Cooling apparatus 1000 includes a battery 1010 that can be charged and discharged and that is a drive source of the vehicle, a battery cooling fan 1012, a DC/DC converter 1020, and a DC/DC converter cooling fan 1022.

Battery 1010 is constituted of, for example as described above, a battery pack, which is constituted of multiple (twenty to thirty) battery modules connected in series, each battery module being constituted of six prismatic battery cells (each having normally an output voltage of about 1.2V) connected in series. Battery 1010 has a size that allows battery 1010 to be stored inside a rear side member in the vehicular width direction.

Cooling apparatus 1000 suctions the air in in-cabin space 2000 from a suction inlet 1030 via a duct 1032 by battery cooling fan 1012 and/or DC/DC converter cooling fan 1022, and thereby cools battery 1010 and/or DC/DC converter 1020.

Downstream from battery cooling fan 1012, duct 1032 branches into a battery-side duct 1034 and a DC/DC converter-side duct 1036. Battery 1010 is installed downstream from battery-side duct 1034, and DC/DC converter cooling fan 1022 is installed downstream from DC/DC converter-side duct 1036. DC/DC converter 1020 is installed downstream from DC/DC converter cooling fan 1022.

The air discharged from battery 1010 passes through a battery-side exhaust duct 1038, while the air discharged from DC/DC converter 1020 passes through DC/DC converter-side exhaust duct 1040. Thereafter, they merge into each other and discharged to the outside of the vehicle from a discharge outlet 1050.

Suction inlet 1030 opens to a rear package tray (a member where normally a speaker of audio equipment or the like is installed) positioned at a portion below a rear glass 2200. That is, as duct 1032 is arranged to extend from above to below as shown in FIG. 3, the in-cabin air flows from above to below as represented by the arrow in FIG. 3. The in-cabin air is suctioned by battery cooling fan 1012 toward battery 1010 (and flows through battery modules). Thereafter, the air having cooled battery 1010 is discharged from discharge outlet 1050 formed behind battery 1010 to the outside of the vehicle.

Irrespective of whether battery cooling fan 1012 is driving or not, when DC/DC converter cooling fan 1022 is driven, the in-cabin air flows from above to below as represented by the arrow in FIG. 3, then it is suctioned toward DC/DC converter 1020, and flows through the cooling fins abutted on a substrate of DC/DC converter 1020. Thereafter, the air having cooled DC/DC converter 1020 is discharged from discharge outlet 1050 formed behind DC/DC converter 1020 to the outside of the vehicle.

Figure 4:
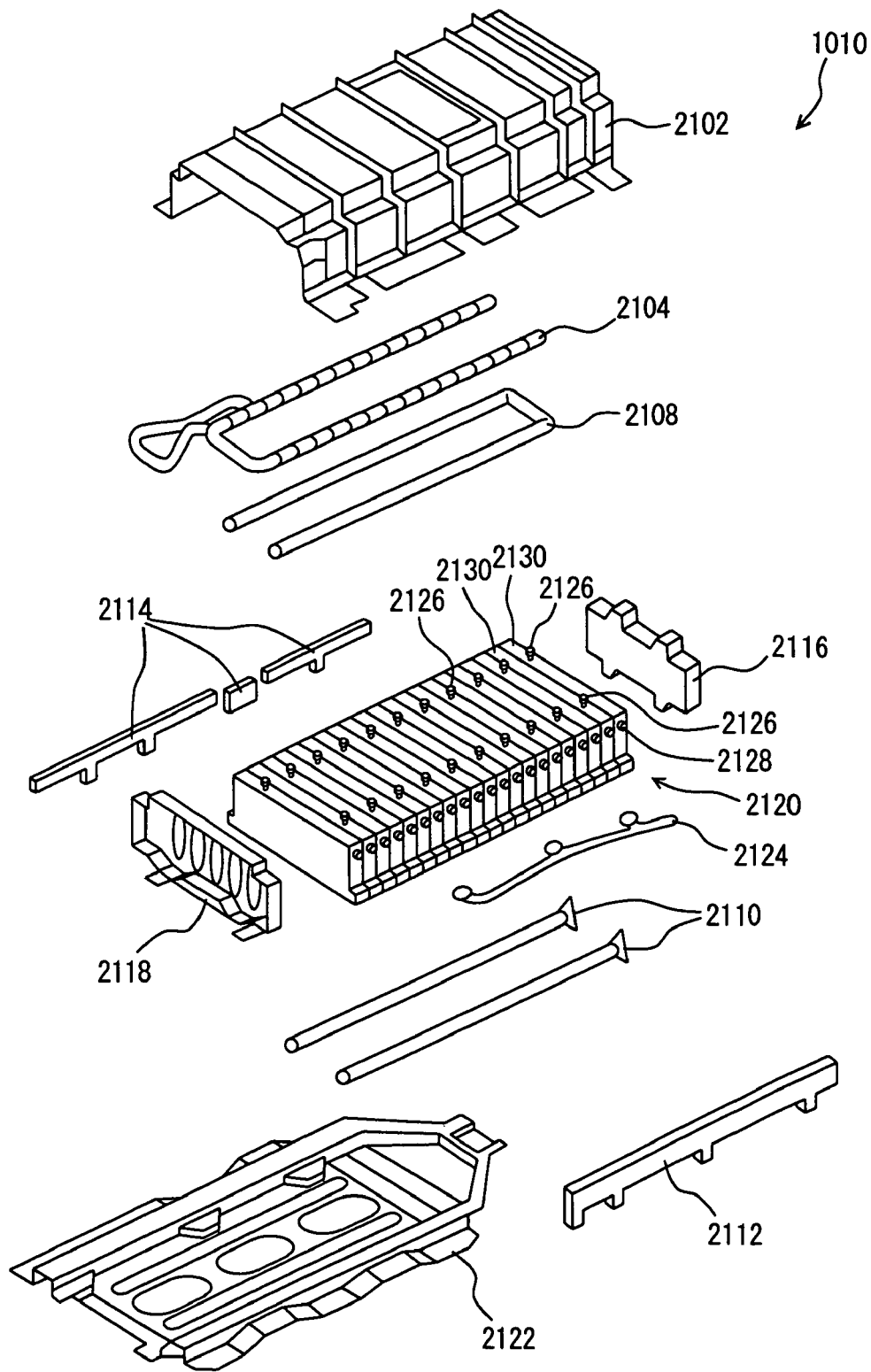
FIG. 4 is a schematic developed view of the battery in FIG. 3.

FIG. 4 is a schematic developed view of battery 1010 in FIG. 3. FIG. 5 is a schematic perspective view of the battery modules constituting battery 1010 in FIG. 4.

As shown in FIG. 4, battery 1010 is structured to have a battery pack 2120 stored inside an exterior member constituted of a battery cover 2102 and a lower case 2122. Battery pack 2120 is formed with a plurality of battery modules 2130 as stacked. Battery module 2130 has an outer shape of what is called a prismatic plate type.

Battery module 2130 includes a plurality of battery cells. Specifically, as shown in FIG. 5, battery module 2130 includes a prismatic case 2138 that is one unit and that is a module exterior member, and six battery cells 2140-2150 divided by walls inside prismatic case 2138. On an end face of prismatic case 2138 in the longitudinal direction, a terminal 2128 is formed. On the side face of prismatic case 2138, protrusions 2152 for forming gaps as passages for cooling air between each of battery modules 2130 are formed. In battery pack 2120 (see FIG. 4) in which battery modules 2130 are stacked, gaps are formed between each of battery modules 2130 by abutment of protrusions 2152 of battery module 2130 on each other and/or abutment of protrusions 2152 on the wall surface of battery module 2130. In FIG. 5, discharge terminal 2126 (see FIG. 4) is not shown, and part of prismatic case 2138 is removed for describing battery cells 2140-2150.

Battery cells 2140-2150 are basically structured similarly to each other. Taking a first battery cell 2140 as an example, battery cell 2140 is constituted of a stacked electrode body 2154, constituted of, for example, a plurality of alternately stacked sheet-like electrode members insulated by separators, and a pair of collector plates 2156 arranged so that stacked electrode body 2154 is interposed therebetween. It is to be noted that stacked electrode body 2154 has been subjected to impregnation or injection of electrolyte.

In stacked electrode body 2154, electrode members to be cathode and electrode members to be anode are alternately stacked. The electrode members to be cathode have their ends connected together to one collector plate 2156. The electrode members to be anode have their ends connected together to the other collector plate (not shown). As a result, all the electrode members to be cathode and one collector plate 2156 are electrically connected. Also, all the electrode members to be anode and the other collector plate are electrically connected. Battery cells 2140-2150 included in battery module 2130 are electrically connected in series. For example, when battery cells 2140-2150 each have a rated voltage of 1.2V, the rated voltage of the whole battery module 2130 is 7.2V. The configuration of battery cells 2140-2150 is not limited to the configuration described above, and may be any other configuration.

As shown in FIG. 4, at the opposing ends of battery pack 2120, binding plates 2116, 2118 are arranged. Binding plates 2116, 2118 are connected and fixed to each other by binding pipes 2108, 2110. Binding plates 2116, 2118 are fixed to a lower case 2122. Each of battery modules 2130 is also fixed to lower case 2122.

On the side face (end face) of each of battery modules 2130 constituting battery pack 2120, as already described, terminal 2128 for input and output of current to and from battery module 2130 is formed. In order to connect terminals 2128 of battery modules 2130 to each other, bus bar modules 2112, 2114 are arranged on the side face of battery pack 2120. By connection of bus bar modules 2112, 2114 to terminals 2128 of battery modules 2130, battery modules 2130 are electrically connected in series in battery pack 2120.

On the upper surface of battery pack 2120, exhaust terminals 2126 including a safety valve for collectively discharging hydrogen gas and the like exhausted from battery modules 2130 are formed. On exhaust terminals 2126, an exhaust hose 2104 connected to exhaust terminals 2126 for discharging hydrogen gas discharged from battery modules 2130 to the outside of battery 1010 is arranged. On the lower surface of battery pack 2120, a temperature sensor 2124 for measuring the temperature of battery pack 2120 and a harness are arranged. In accordance with the output of temperature sensor 2124, cooling air is supplied from inside the cabin to battery pack 2120 using battery cooling fan 1012, in order to maintain the temperature of battery pack 2120 within a prescribed range.

As battery module 2130 has protrusions 2152, when battery modules 2130 are arranged next to each other as shown in FIG. 4, protrusions 2152 produce gaps between each of battery modules 2130. Cooling air is allowed to flow through the gaps from above battery modules 2130 to below thereof (the downflow scheme). This cooling air cools battery modules 2130.

FIG. 6 is a schematic developed view of DC/DC converter 1020 in FIG. 3. As shown in FIG. 6, DC/DC converter 1020 is constituted of a semiconductor device 3030, a transformer 3040 and a substrate 3050, which are covered by an electromagnetic shield cover 3010. In particular, semiconductor device 3030 and transformer 3040 that emit a great amount of heat are arranged to abut on cooling fin 3020. Cooling air is introduced from DC/DC converter-side intake duct 1036 toward cooling fin 3020. The cooling air having deprived cooling fin 3020 of heat passes through DC/DC converter-side exhaust duct 1040, and discharged from discharge outlet 1050 to the outside of the vehicle. It is to be noted that the material of cooling fin 3020 is of high thermal conductivity.

FIG. 7 is a schematic view of the structure of cooling apparatus 1000 shown in FIG. 3. Battery-side intake duct 1034 is constituted of a battery-side intake duct 1034A before DC/DC converter-side intake duct 1036 branches therefrom, and a battery-side intake duct 1034B after DC/DC converter-side intake duct 1036 branches therefrom. Battery-side exhaust duct 1038 is constituted of a battery-side exhaust duct 1038B before merging into DC/DC converter-side exhaust duct 1040 and a battery-side exhaust duct 1038A after merging into DC/DC converter-side exhaust duct 1040. The remainder of the structure is the same as in FIG. 3 described above, and therefore detailed description thereof is not repeated.

With such a structure, the resistance of the pipe line of intake ducts and exhaust ducts can be made small, and the pressure loss of the cooling air can be reduced. Accordingly, the rated capacity (defined by the discharge flow rate and the discharge pressure) of the cooling fans can be reduced, and the power consumption can be reduced.

Figure 8:
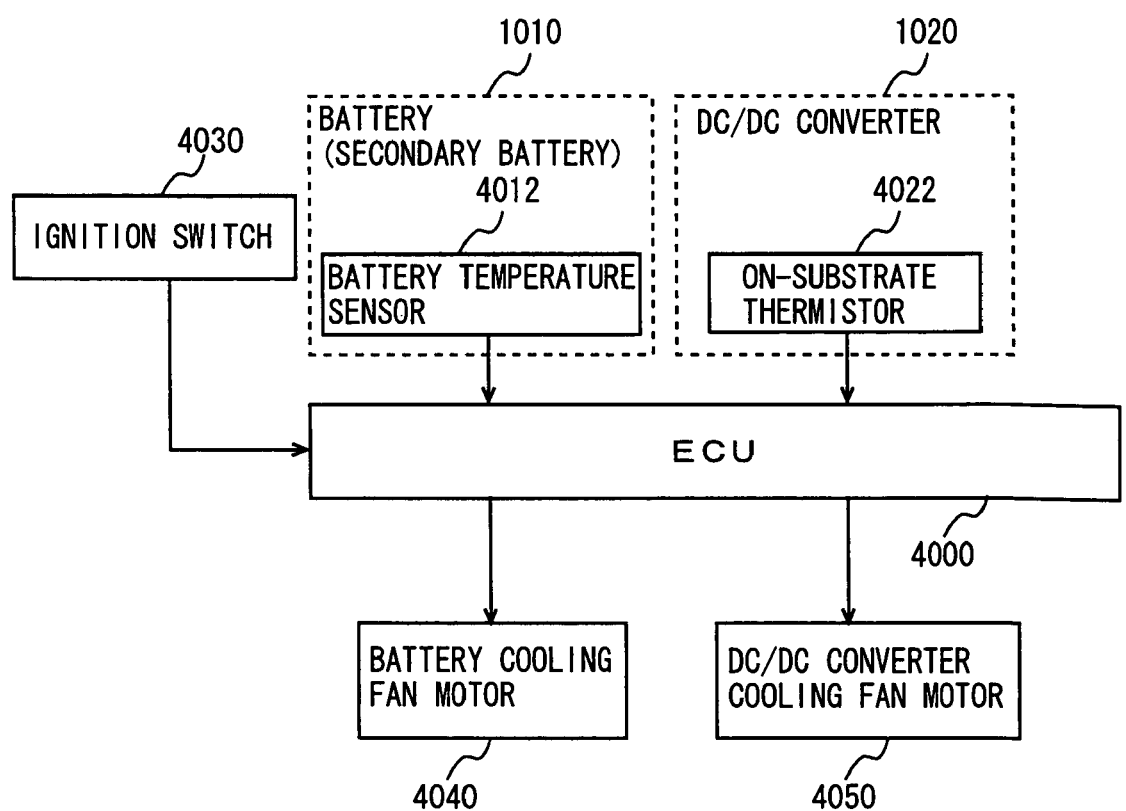
FIG. 8 is a control block diagram of the cooling apparatus according to the embodiment of the present invention.

FIG. 8 is a control block diagram of cooling apparatus 1000 according to the embodiment of the present invention. As shown in FIG. 8, cooling apparatus 1000 is controlled by an ECU (Electronic Control Unit) 4000.

Battery 1010 is provided with a battery temperature sensor 4012 sensing the temperature (representative temperature) of battery 1010. Battery temperature sensor 4012 corresponds to temperature sensor 2124 shown in FIG. 4. DC/DC converter 1020 is provided with an on-substrate thermistor 4022 on substrate 3050 for sensing the temperature of DC/DC converter 1020.

Battery temperature sensor 4012 and on-substrate thermistor 4022 are connected to ECU 4000, and respectively transmit the battery temperature and the DC/DC converter temperature to ECU 4000. Based on the temperatures, ECU 4000 outputs motor drive command signals respectively for controlling a battery cooling fan motor 4040 driving battery cooling fan 1012 and DC/DC converter cooling fan motor 4050 driving DC/DC converter cooling fan 1022. It may be also possible to control continuously or stepwise the rotation speed of battery cooling fan motor 4040 and DC/DC converter cooling fan motor 4050 by voltage control or current control. This allows ECU 4000 to control the characteristics (flow rate characteristics, pressure characteristics) of battery cooling fan 1012 and DC/DC converter cooling fan 1022. It is assumed that battery cooling fan 1012 is greater than DC/DC converter cooling fan 1022 in rated capacity (and also in discharge flow rate and discharge pressure).

Figure 9:
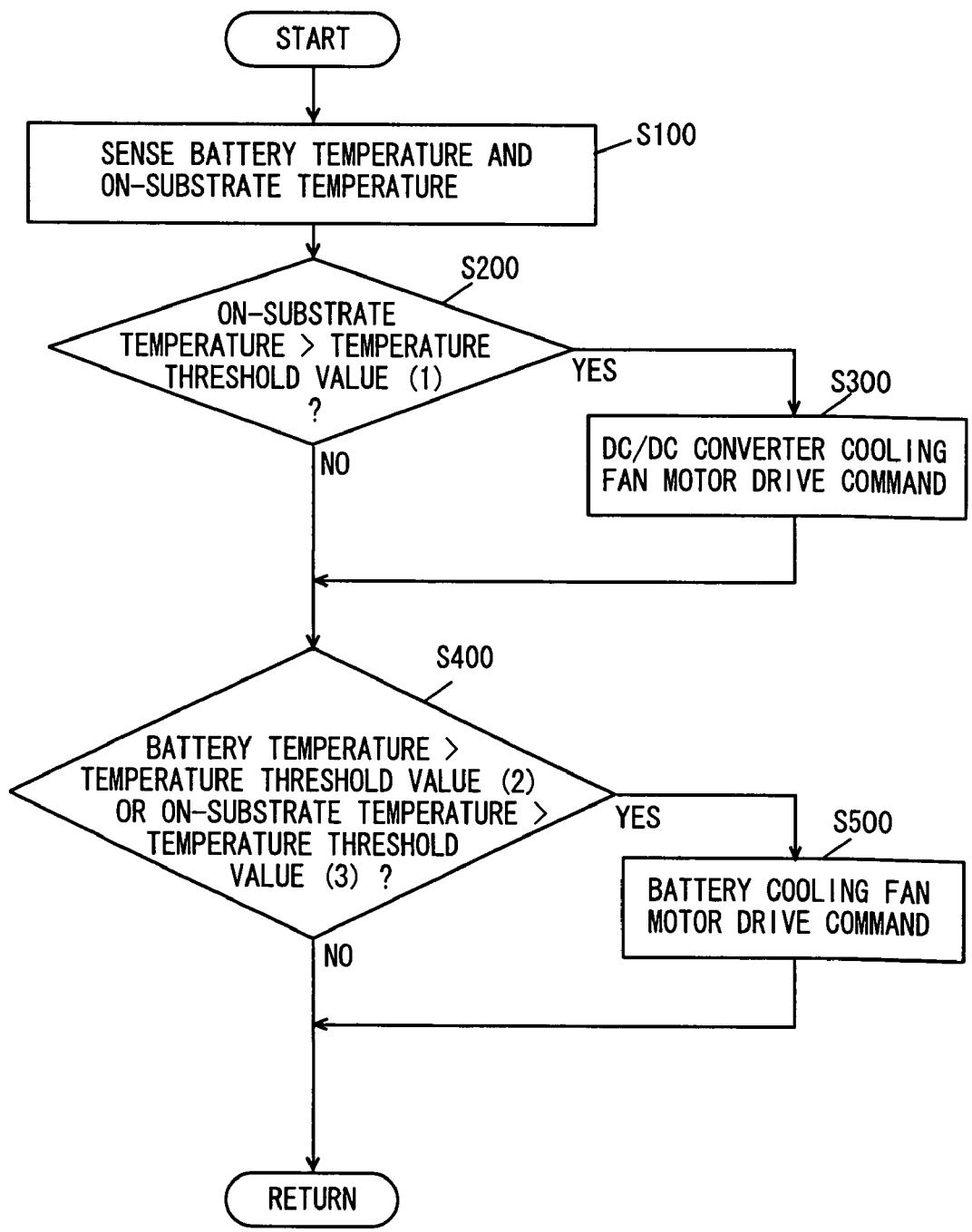
FIG. 9 is a flowchart showing a control structure of a program executed by the ECU in FIG. 8

Referring to FIG. 9, a control structure of a program executed by ECU 4000 in FIG. 8 is described. The program represented by the flowchart of FIG. 9 is repeatedly executed at regular intervals (cycle time), once the ignition switch enters a state corresponding to the start of activation of the HV system.

In step (hereinafter step is expressed by S) 100, the temperature of battery 1010 and the temperature on substrate 3050 representing the temperature of DC/DC converter 1020 are sensed. Here, ECU 4000 senses respective temperatures based on an input signal from battery temperature sensor 4012 and an input signal from on-substrate thermistor 4022.

In S200, ECU 4000 determines whether or not the on-substrate temperature is higher than a temperature threshold value (1). When the on-substrate temperature is higher than temperature threshold value (1) (YES in S200), the process proceeds to S300. Otherwise (NO in S200), the process proceeds to S400.

In S300, ECU 4000 outputs a drive command to DC/DC converter cooling fan motor 4050. By the drive command, DC/DC converter cooling fan 1022 operates and the cooling air is supplied from the cabin to DC/DC converter 1020 only.

In S400, ECU 4000 determines whether or not the battery temperature is higher than a temperature threshold value (2), or whether or not the on-substrate temperature is higher than a temperature threshold value (3). It is to be noted that temperature threshold value (3) is set to be higher than temperature threshold value (1). When the battery temperature is higher than temperature threshold value (2) or the on-substrate temperature is higher than temperature threshold value (3) (YES in S400), the process proceeds to S500. Otherwise (NO in S400), the process ends.

In S500, ECU 4000 outputs a drive command to battery cooling fan motor 4040. By the drive command, battery cooling fan 1012 operates and the cooling air is supplied from inside the cabin to battery 1010 and DC/DC converter 1020.

An operation of cooling apparatus 1000 according to the embodiment of the present invention based on the above-described structure and flowchart will be described. It is assumed that, by the setting of temperature threshold value (1), temperature threshold value (2), and temperature threshold value (3), a state occurs where a cooling request from DC/DC converter 1020 is present and cooling request from battery 1010 is not present.

[Battery Cooling Request not Present, DC/DC Converter Cooling Request Present]

When the ignition switch is operated and the HV system starts operation, the battery temperature and the on-substrate temperature are sensed (S100). When the on-substrate temperature of DC/DC converter 1020 is higher than temperature threshold value (1) (YES in S200), and the temperature of battery 1010 is not higher than temperature threshold value (2) (YES in S400), it is determined that it is a state where "a cooling request from battery 1010 is not present and a cooling request from DC/DC converter 1020 is present". It is assumed that the on-substrate temperature of DC/DC converter 1020 is not higher than temperature threshold value (3).

In such a state, a drive command is output to DC/DC converter cooling fan motor 4050 so that only DC/DC converter cooling fan 1022 having a small rated capacity operates (S300). Here, battery cooling fan 1012 does not operate.

Thus, when only DC/DC converter 1020 requests cooling, which has a great amount of heat emission as compared to battery 1010 and the heat emission greatly fluctuates in accordance with the drive state of the vehicle, DC/DC converter 1020 can appropriately be cooled using only DC/DC converter cooling fan 1022 having a small rated capacity.

[Battery Cooling Request not Present, Further DC/DC Converter Cooling Request Present]

When the on-substrate temperature of DC/DC converter 1020 is higher than temperature threshold value (1) (YES in S200), and the temperature of battery 1010 is not higher than temperature threshold value (2) but the on-substrate temperature of DC/DC converter 1020 is higher than temperature threshold value (3) (YES in S400), it is determined that it is a state where "a cooling request from battery 1010 is not present and a further cooling request from DC/DC converter 1020 is present".

In such a state, a drive command is output to DC/DC converter cooling fan motor 4050 (S300), and also a drive command is output to battery cooling fan motor 4040 (S500), so that battery cooling fan 1012 having a great rated capacity operates in addition to DC/DC converter cooling fan 1022 having a small rated capacity. Accordingly, battery cooling fan 1012 and DC/DC converter cooling fan 1022 operate here.

Thus, when DC/DC converter 1020 further requests cooling, which has a great amount of heat emission as compared to battery 1010 and the heat emission greatly fluctuates in accordance with the drive state of the vehicle, in addition to DC/DC converter cooling fan 1022 having a small rated capacity, battery cooling fan 1012 having a great rated capacity is operated, so that the cooling air of a great flow rate is sent to DC/DC converter 1020 to sufficiently cool DC/DC converter 1020. Here, though the flow of cooling air to battery 1010 is established by the operation of battery cooling fan 1012, DC/DC converter cooling fan 1022 is operating. Therefore, the pressure in the intake duct on DC/DC converter 1020 side is low, and the cooling air flows through DC/DC converter 1020 in greater amount. Thus, DC/DC converter 1020 requesting further cooling can appropriately be cooled. Here, as seen from DC/DC converter 1020, two cooling fans are connected in series.

[Battery Cooling Request Present, DC/DC Converter Cooling Request Present]

When the on-substrate temperature of DC/DC converter 1020 is higher than temperature threshold value (1) (YES in S200), and the temperature of battery 1010 is higher than temperature threshold value (2) or the on-substrate temperature of DC/DC converter 1020 is higher than temperature threshold value (3) (YES in S400), it is determined that it is a state where "a cooling request from battery 1010 is present and a (further) cooling request from DC/DC converter 1020 is present".

In such a state, a drive command is output to DC/DC converter cooling fan motor 4050 (S300), and also a drive command is output to battery cooling fan motor 4040 (S500), so that battery cooling fan 1012 having a great rated capacity operates in addition to DC/DC converter cooling fan 1022 having a small rated capacity. Accordingly, battery cooling fan 1012 and DC/DC converter cooling fan 1022 operate here.

Thus, when battery 1010 and DC/DC converter 1020 request cooling, in addition to DC/DC converter cooling fan

1022 having a small rated capacity, battery cooling fan 1012 having a great rated capacity is operated, so that the cooling air of a great flow rate is sent to battery 1010 and DC/DC converter 1020 to sufficiently cool battery 1010 and DC/DC converter 1020.

Here, since the rated capacity of DC/DC converter cooling fan 1022 is smaller than that of battery cooling fan 1012, a situation can be avoided where the cooling air sent by battery cooling fan 1012 is entirely suctioned by DC/DC converter cooling fan 1022 and sent only to DC/DC converter 1020 whereby cooling air for battery 1010 becomes insufficient. This can also be inferred from the following. Provided that the rated capacity of DC/DC converter cooling fan 1022 is greater than that of battery cooling fan 1012, the cooling air sent by battery cooling fan 1012 (small rated capacity) may entirely be suctioned by DC/DC converter cooling fan 1022 (great rated capacity).

When a cooling request from battery 1010 is present and a cooling request from DC/DC converter 1020 is not present, only battery cooling fan 1012 may be operated.

As above, according to the cooling apparatus of the embodiment of the present invention, when branched intake passages are provided to cool two types of cooling targets (the battery and the DC/DC converter), two cooling fans having different rated capacity are respectively arranged before and after the branching portion of the intake passages. Here, the cooling fan having the smaller rated capacity is arranged in the intake passage after branched toward the cooling target of which cooling request would become greater. With such a configuration, when the cooling request of the cooling target of which cooling request would become greater is small, the cooling air is sent using only the cooling fan having the smaller rated capacity arranged after the branch. When the cooling request of the cooling target of which cooling request would become greater becomes further greater, the two cooling fans are operated so that they are connected in series and send the cooling air. When the two cooling targets request cooling, the two cooling fans are operated to send the cooling air. When the two cooling fans are operated, two cooling targets can appropriately be cooled while a situation where only one of them is supplied with the cooling air is avoided, since the two cooling fans have different rated capacity and the one having the smaller rated capacity is arranged after the branch.

It is to be noted that DC/DC converter 1020 and DC/DC converter cooling fan 1022 may integrally be configured. With such a configuration, the control substrate of DC/DC converter cooling fan motor 4050 can be incorporated into the substrate of DC/DC converter 1020. Furthermore, in addition to such integration, if DC/DC converter 1020 and DC/DC converter cooling fan 1022 are sealed, leakage of air can be eliminated and the cooling capacity can be improved.

Furthermore, instead of the structure shown schematically in FIG. 7, the following structures may also be possible:

1) instead of installing DC/DC converter cooling fan 1022, install a control valve for adjusting the cross-sectional area of the pipe line of DC/DC converter-side intake duct 1036, at a branching portion of battery-side intake duct 1034A and DC/DC converter-side intake duct 1036;

2) instead of installing DC/DC converter cooling fan 1022, install a control valve for adjusting the cross-sectional area of the pipe line of DC/DC converter-side exhaust duct 1036, at a merging portion of battery-side exhaust duct 1038B and DC/DC converter-side intake duct 1040, or at the pipe line upstream or downstream from the merging portion;

3) install DC/DC converter cooling fan 1022 on the upstream side of DC/DC converter 1020;

4) instead of installing DC/DC converter cooling fan 1022, install a cooling fan at battery-side intake duct 1034B (that is, install a cooling fan immediately upstream from battery 1010);

5) install battery cooling fan 1012 and DC/DC converter cooling fan 1022 not on the upstream side of battery 1010 and DC/DC converter 1020, but on the downstream side thereof; and 6) form the branching portion not as a 90° branch but as a Y-shaped branch so that the pressure loss of the flow passage is reduced.

It is to be noted that, even if the intake inlet is provided inside the cabin, by installing the DC/DC converter fan of which utilization rate is high on the downstream side, reduction in NV (Noise & Vibration) of the cooling system can be realized.

It should be understood that the embodiment disclosed herein is illustrative and non-restrictive in every respect. The scope of the present invention is defined by the terms of the claims, rather than the description and example above, and is intended to include any modifications and changes within the scope and meaning equivalent to the terms of the claims.

The invention claimed is:

1. An in-vehicle device cooling apparatus cooling a power storage mechanism and an electric device that are incorporated in a vehicle, comprising:
 a first supply passage supplying, to said power storage mechanism, a medium that cools said power storage mechanism; and
 a second supply passage supplying, to said electric device, a medium that cools said electric device, wherein one of said first and second supply passages branches from the other at a branching portion on an upstream side of said power storage mechanism and said electric device; and
 an adjustment mechanism adjusting a flow rate of the medium supplied to said first supply passage and a flow rate of the medium supplied to said second supply passage based on a cooling request of said power storage mechanism and a cooling request of said electric device,
 wherein said adjustment mechanism includes:
  a medium supply mechanism that is installed upstream from said branching portion and that supplies the medium; and
  a medium adjustment mechanism that is installed in said second supply passage downstream from said branching portion and that adjusts the flow rate of the medium supplied to said second supply passage.

2. The in-vehicle device cooling apparatus according to claim 1, wherein said medium adjustment mechanism includes a mechanism that varies a cross-sectional area of an opening of said second supply passage.

3. The in-vehicle device cooling apparatus according to claim 1,
 wherein said medium supply mechanism is a first medium supply mechanism that is installed upstream from said branching portion and that supplies the medium, and
 said medium adjustment mechanism includes:
  a second medium supply mechanism that is installed in said second supply passage downstream from said branching portion and that supplies the medium; and
  a control unit controlling said medium supply mechanisms.

4. The in-vehicle device cooling apparatus according to claim 3, wherein said second medium supply mechanism is installed in a supply passage where one of said power storage mechanism and said electric device having a greater cooling request than the other of said power storage mechanism and said electric device is installed.

5. The in-vehicle device cooling apparatus according to claim 4, wherein a capacity of said second medium supply mechanism is smaller than a capacity of said first medium supply mechanism.

6. The in-vehicle device cooling apparatus according to claim 5, wherein said medium is gas and said medium supply mechanism is a fan.

7. The in-vehicle device cooling apparatus according to claim 1, wherein said power storage mechanism is at least one of a secondary battery and a capacitor, and said electric device is a power converting device.

8. The in-vehicle device cooling apparatus according to claim 7, wherein said power converting device is at least one of an inverter and a converter.

9. The in-vehicle device cooling apparatus according to claim 1, wherein a cooling capacity by the medium in said second supply passage is smaller than a cooling capacity by the medium in said first supply passage.

10. An in-vehicle device cooling apparatus cooling a power storage mechanism and an electric device that are incorporated in a vehicle, comprising:
a first supply passage supplying, to said power storage mechanism, a medium that cools said power storage mechanism; and
a second supply passage supplying, to said electric device, a medium that cools said electric device, wherein one of said first and second supply passages merges into the other at a merging portion on a downstream side of said power storage mechanism and said electric device; and
an adjustment mechanism adjusting a flow rate of the medium supplied to said first supply passage and a flow rate of the medium supplied to said second supply passage based on a cooling request of said power storage mechanism and a cooling request of said electric device, wherein said adjustment mechanism includes:

a medium supply mechanism that is installed downstream from said merging portion and that supplies the medium, and
a medium adjustment mechanism that is installed in said second supply passage upstream from said merging portion and that adjusts the flow rate of the medium supplied to said second supply passage.

11. The in-vehicle device cooling apparatus according to claim 10, wherein said medium adjustment mechanism includes a mechanism that varies a cross-sectional area of an opening of said second supply passage.

12. The in-vehicle device cooling apparatus according to claim 10, wherein
said medium supply mechanism is a first medium supply mechanism that is installed downstream from said merging portion and that supplies the medium, and
said medium adjustment mechanism includes a second medium supply mechanism that is installed in said second supply passage upstream from said merging portion and that supplies the medium; and
a control unit controlling said medium supply mechanisms.

13. The in-vehicle device cooling apparatus according to claim 12, wherein said second medium supply mechanism is installed in a supply passage where one of said power storage mechanism and said electric device having a greater cooling request than the other of said power storage mechanism and said electric device is installed.

14. The in-vehicle device cooling apparatus according to claim 13, wherein a capacity of said second medium supply mechanism is smaller than a capacity of said first medium supply mechanism.

15. The in-vehicle device cooling apparatus according to claim 14, wherein said medium is gas and said medium supply mechanism is a fan.

* * * * *